United States Patent
Blake, III et al.

(10) Patent No.: US 10,356,307 B2
(45) Date of Patent: Jul. 16, 2019

(54) VEHICLE CAMERA SYSTEM

(71) Applicant: TRW AUTOMOTIVE U.S. LLC, Livonia, MI (US)

(72) Inventors: Thomas E. Blake, III, Novi, MI (US); Anthony L. Rivas, Howell, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 120 days.

(21) Appl. No.: 15/702,805

(22) Filed: Sep. 13, 2017

(65) Prior Publication Data

US 2019/0082096 A1 Mar. 14, 2019

(51) Int. Cl.
*G01B 21/22* (2006.01)
*G01P 15/00* (2006.01)
*H04N 5/225* (2006.01)
*H04N 5/232* (2006.01)

(52) U.S. Cl.
CPC ......... *H04N 5/23209* (2013.01); *G01B 21/22* (2013.01); *H04N 5/2254* (2013.01); *G01P 15/00* (2013.01)

(58) Field of Classification Search
CPC ..... G01B 21/22; G01P 15/00; H04N 5/23209; H04N 5/2254
See application file for complete search history.

(56) References Cited

U.S. PATENT DOCUMENTS

2006/0204037 A1* 9/2006 Watanabe .......... G06K 9/00805
382/104

* cited by examiner

*Primary Examiner* — Huy T Nguyen
(74) *Attorney, Agent, or Firm* — Tarolli, Sundheim, Covell & Tummino LLP

(57) ABSTRACT

A camera system for a vehicle includes a first lens connected to the vehicle. The first lens has a first field of view in which images are captured extending in front of the vehicle. A second lens is connected to the vehicle and has a second field of view in which images are captured different from the first field of view. The second field of view extends in front of the vehicle. A sensor is provided for measuring vehicle pitch. A controller is connected to the sensor and relies only on the first lens to capture images when the vehicle pitch is below a predetermined threshold. The controller relies only the second lens to capture images when the vehicle pitch is above the predetermined threshold.

20 Claims, 7 Drawing Sheets

VEHICLE CAMERA SYSTEM

TECHNICAL FIELD

The present invention relates generally to camera systems and, more specifically, relates to a vehicle camera system that switches between lenses in response to vehicle pitch.

BACKGROUND

Cameras in commercial vehicles provide the driver with real-time visualization of objects in front of and around the vehicle. When the vehicle pitches, however, the field of view of the camera lenses can shift such that undesirable blind spots form. This makes accurately imaging the vehicle surroundings difficult and thereby frustrates the ability of vehicle systems to react thereto.

SUMMARY

In accordance with an example of the present invention, a camera system for a vehicle includes a first lens connected to the vehicle. The first lens has a first field of view in which images are captured extending in front of the vehicle. A second lens is connected to the vehicle and has a second field of view in which images are captured different from the first field of view. The second field of view extends in front of the vehicle. A sensor is provided for measuring vehicle pitch. A controller is connected to the sensor and relies only on the first lens to capture images when the vehicle pitch is below a predetermined threshold. The controller relies only the second lens to capture images when the vehicle pitch is above the predetermined threshold.

In another example, a method of capturing images in front of a vehicle includes connecting a first lens to the vehicle having a first field of view in which images are captured extending in front of the vehicle. A second lens is connected to the vehicle and has a second field of view in which images are captured different from the first field of view and extending in front of the vehicle. Vehicle pitch is sensed. Images are captured by relying only on the first lens when the vehicle pitch is below a predetermined threshold. Images are captured by relying only the second lens when the vehicle pitch is above the predetermined threshold.

In another example, a method of capturing images in front of a vehicle includes connecting a first lens to the vehicle having a first field of view in which images are captured extending in front of the vehicle. A second lens is connected to the vehicle and has a second field of view in which images are captured different from the first field of view and extending in front of the vehicle. Vehicle pitch is sensed. Images are captured with both the first and second lenses when the vehicle pitch is below a predetermined threshold. Images are captured by relying only on one of the first lens or the second lens when the vehicle pitch is above the predetermined threshold.

Other objects and advantages and a fuller understanding of the invention will be had from the following detailed description and the accompanying drawings.

DETAILED DESCRIPTION

Figure 1:
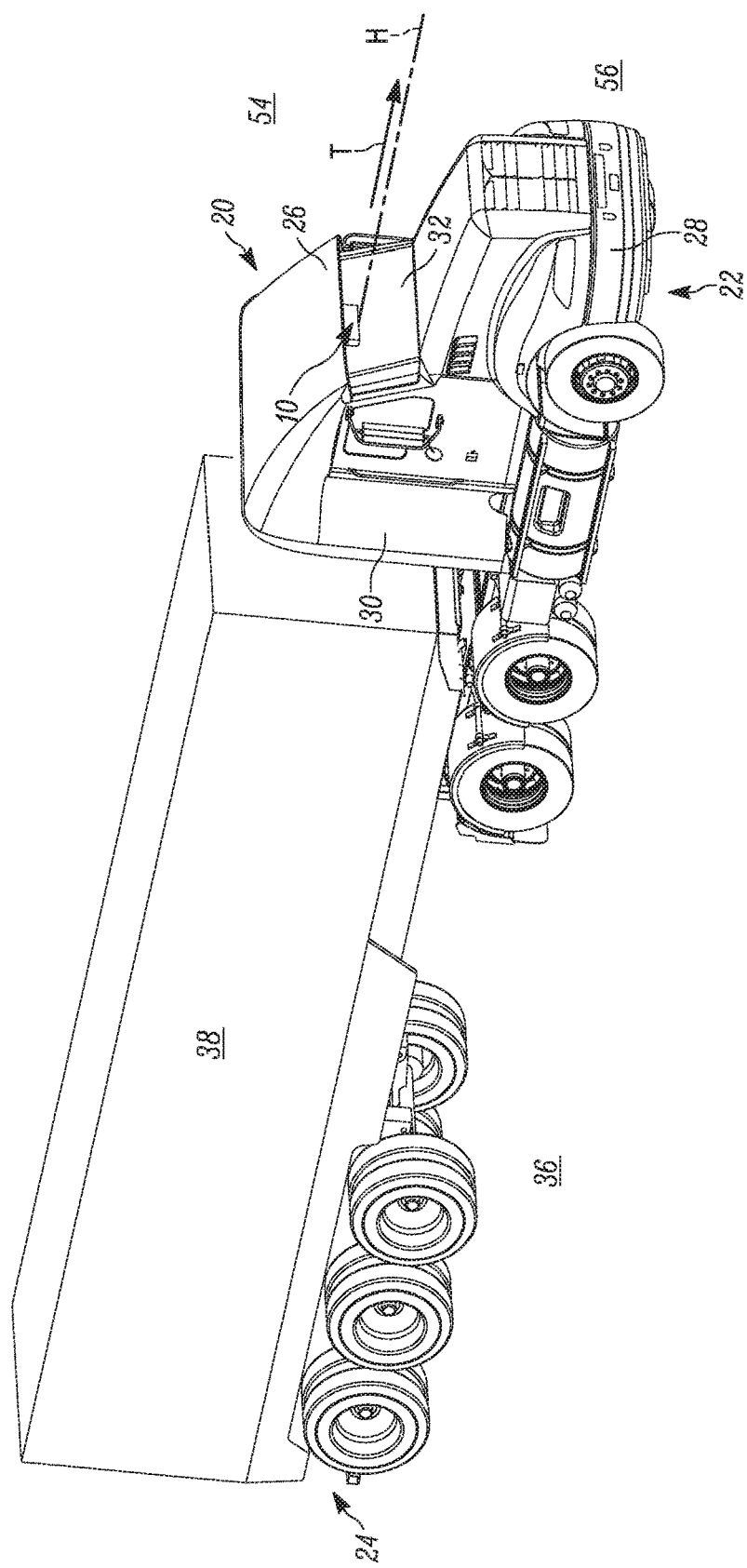
FIG. 1 is a schematic illustration of a vehicle including a camera system in accordance with an embodiment of the present invention.

The present invention relates generally to camera systems and, more specifically, relates to a vehicle camera system that switches between lenses in response to vehicle pitch. FIG. 1 illustrates a camera system 10 on a vehicle 20 in accordance with an embodiment of the present invention. In one example, the vehicle 20 is a commercial vehicle, e.g., tractor trailer, although other vehicle types are contemplated. The vehicle 20 extends from a front end 22 to a rear end 24. The vehicle 20 includes a cab 30 and a trailer 38 connected to the cab. The cab 30 includes a windshield 32 through which the driver looks while driving the vehicle 20 in a direction of travel T along a surface, e.g., paved road 36. The cab 30 also includes a roof 26 and a front bumper 28 adjacent the road 36.

The driver's line of sight through the windshield 32 in the direction of travel T is indicated generally by the line H. When the road 36 is substantially flat, the line of sight H corresponds generally with the horizon dividing the sky from the earth. When the road 36 inclines, the line of sight H extends above the horizon. When the road declines, the line of sight H extends below the horizon. That said, an area above the line of sight H is indicated at 54 and includes more of the sky when the road 36 is inclined. An area below the line of sight H is indicated at 56 and includes more of the earth when the road 36 is declined.

Figure 2:
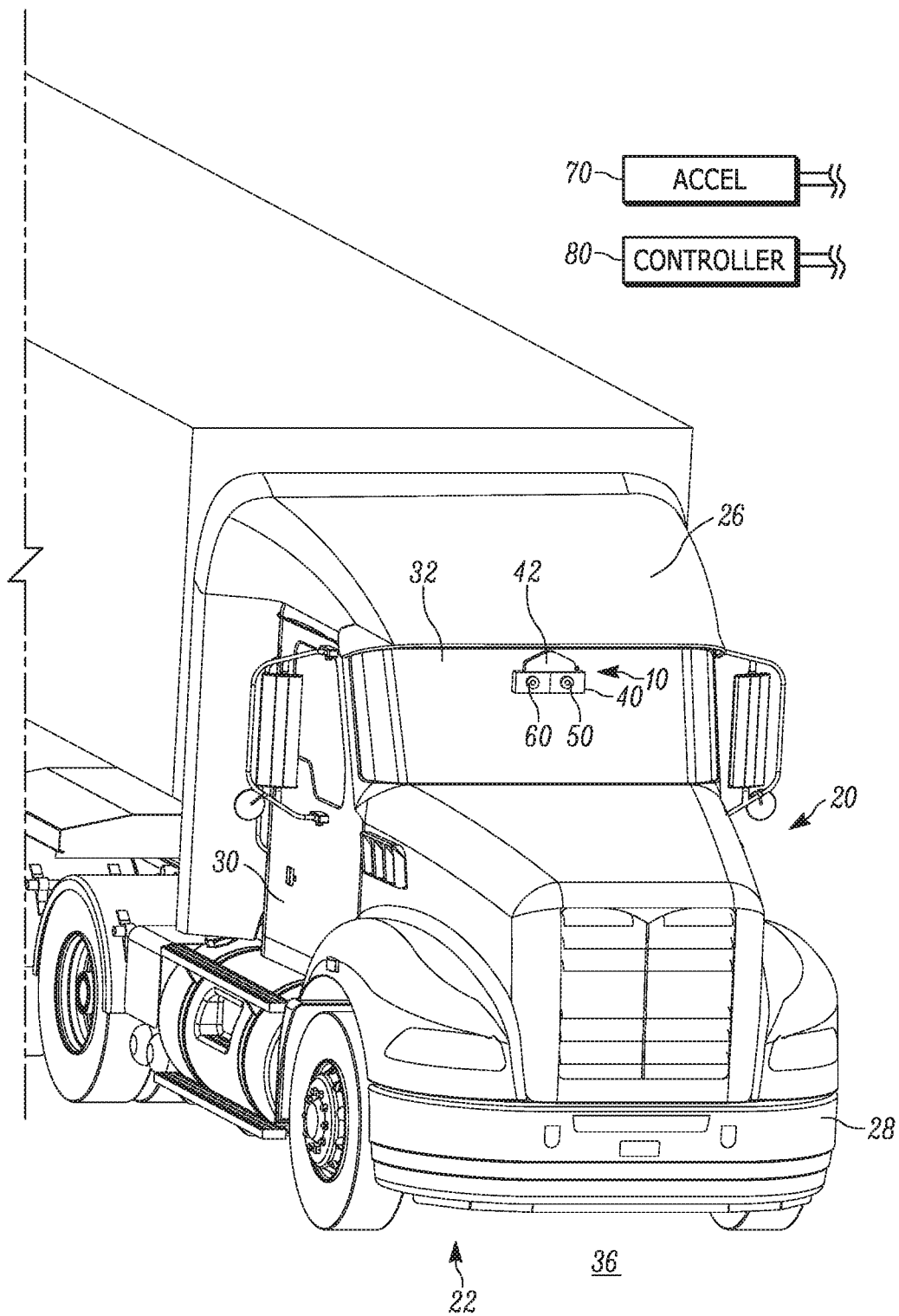
FIG. 2 is an enlarged front view of a portion of FIG. 1.

Referring to FIG. 2, the camera system 10 includes a plurality of lenses for capturing images (still and/or moving) of objects in front of the vehicle 20. The camera system 10 includes first and second lenses 50, 60 but could alternatively include additional lenses. The lenses 50, 60 can be part of a single camera or separate cameras (not shown). The first and second lenses 50, 60 are provided in and extend through a housing 40. The housing 40 includes a bracket 42 snap-fit to each lens 50, 60. The bracket 42 is secured to the interior of the windshield 32 adjacent the roof 26 of the cab 30 via, for example, adhesive. As shown, the lenses 50, 60 are located at the same height on the cab 30 above the road 36, although other lens positions on the vehicle 20 are contemplated.

Figure 3:
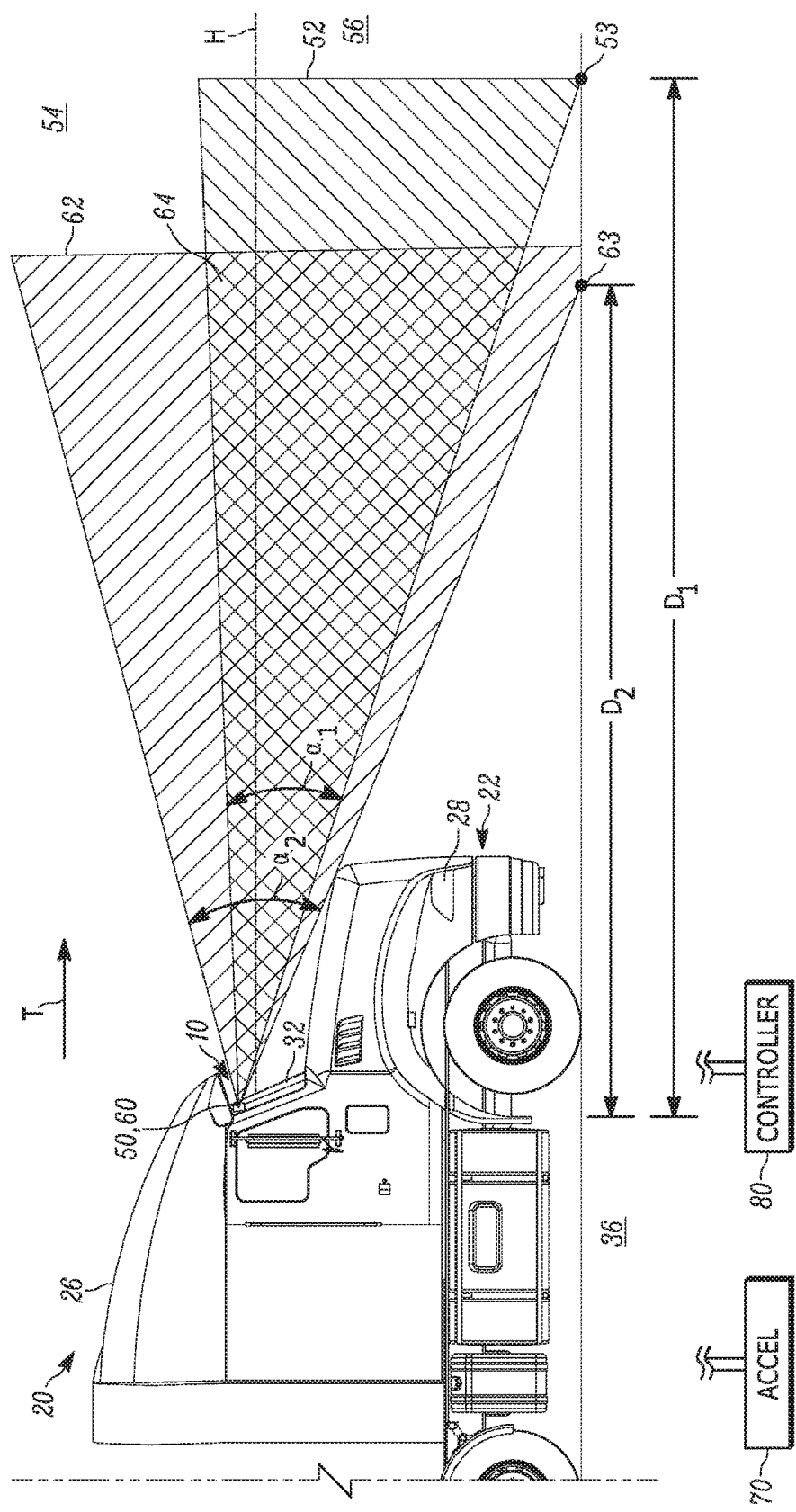
FIG. 3 is a side view of the vehicle of FIG. 1 illustrating fields of view of lenses in the camera system.

As shown in FIG. 3, the lenses 50, 60 are configured to have fields of view directed forward of the vehicle 20 for capturing images of objects in the vehicle's direction of travel T. The first lens 50 has a conical field of view 52 with a coverage area predominantly in the area 56 below the line of sight H but extending to the area 54 above the line of sight. The field of view 52 extends over an angular range $\alpha_1$. The field of view 52 first intersects the road 36 in front of the vehicle 20 at a location 53 spaced a longitudinal distance $D_1$ from the first lens 50. The angular range $\alpha_1$ and distance $D_1$ are selected such that the field of view 52 extends over objects, e.g., other vehicles, pedestrians or construction barrels, that would normally be in front of the vehicle 20 during travel in the direction T.

The second lens 60 has a conical field of view 62 with a coverage area extending above and below the line of sight H. The field of view 62 extends over an angular range $a_2$ that is greater than the angular range $a_1$ of the field of view 52. As shown, the field of view 62 extends both above and below the field of view 52. It will be appreciated that the fields of view 52, 62 could extend over the same angular range and be tilted away from one another (not shown) such that the field of view 62 extends below the field of view 52, i.e., closer to the front bumper 28 and road 36, but not above the field of view 52. In any case, the field of view 62 first intersects the road 36 in front of the vehicle 20 at a location 63 spaced a longitudinal distance $D_2$ from the second lens 60. The distance $D_2$ is less than the distance $D_1$.

Although the fields of view 52, 62 are shown as having a definitive depth in front of the vehicle 20, it will be understood that the depth shown corresponds with the portion of the entire field of view useful to the driver and camera system 10. In other words, for purposes of the invention, the additional depth of the fields of view 52, 62 beyond the depth shown are not germane to operation of the camera system 10. Consequently, any subsequent reference to the fields of view 52, 62 refers to the useful portions of the fields of view shown and not the entire fields of view.

As shown, the fields of view 52, 62 overlap one another in a hatched region 64 along, and on opposite sides of, the line of sight H. It will be appreciated that the fields of view 52, 62 and overlap region 64 can be different from that shown in FIG. 3. Each field of view 52, 62 will vary depending on a number of factors, e.g., the height of the lenses 50, 60 above the road 36, the lens field of view, the geometry of the front end 22 of the vehicle 20, and how close/far in front of the vehicle the lenses 50, 60 capture images as determined by the OEM, supplier, and/or technology providers.

Referring to FIG. 3, the lens 50 is used as the primary or default viewing device for the camera system 10 and, thus, images are primarily taken within the field of view 52 during the normal driving condition shown. The camera system 10 does not initially rely on the lens 60 for image capturing or process images therefrom. As the vehicle 20 travels in the direction T, the lens 50 continuously takes images of the area in front of the vehicle within the field of view 52 and therefore including both areas 54, 56. The images [or signals indicative thereof] are sent to a controller 80 on the vehicle 20. The controller 80 evaluates the images and communicates with other vehicle systems based on the evaluation. The controller 80 can, for example, monitor and evaluate vehicle following distance, collision avoidance, lane departure, and rollover stability based on the images received and actuate one or more vehicle systems in response to the evaluations.

Figure 4A:
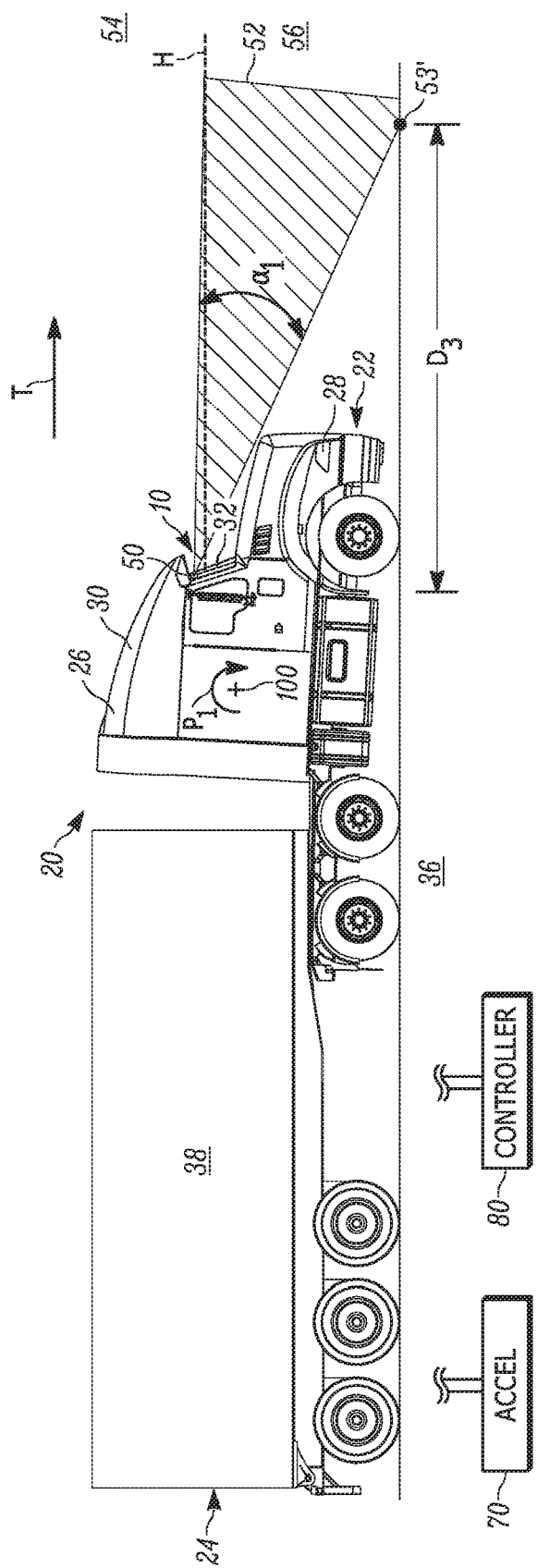
FIG. 4A is a side view of a first condition of the camera system when the vehicle pitches forward less than a predetermined amount.
Figure 4B:
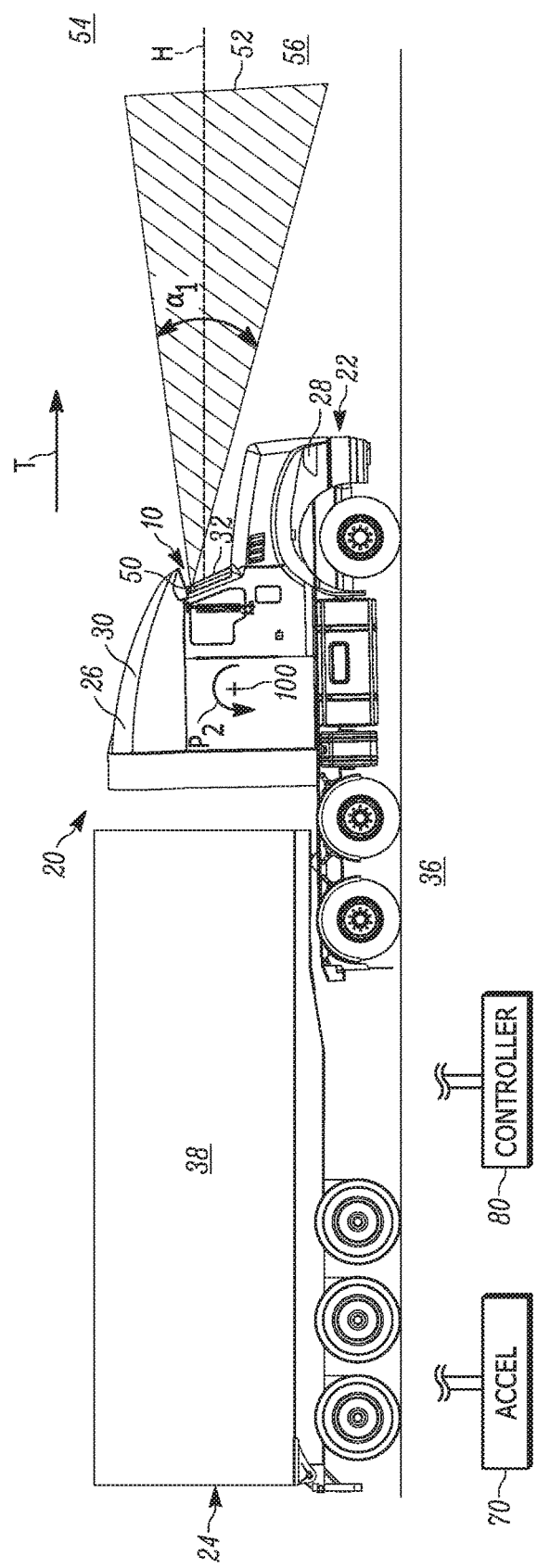
FIG. 4B is a side view of a second condition of the camera system when the vehicle pitches backward less than a predetermined amount.

When the vehicle 20 travels in the direction T, abrupt changes in vehicle speed due to acceleration or braking cause the vehicle, i.e., the cab 30, to pitch about an axis 100 extending laterally across the vehicle through its center of gravity (see FIGS. 4A-4B). A sensor 70, e.g., an accelerometer, on the vehicle 20 detects changes in the vehicle pitch about the axis 100. Any change in pitch is relative to a static or normal condition of the vehicle 20 in which the front end 22 extends generally parallel to the road 36 (see FIG. 3). By convention, pitching forward in the direction $P_1$ (FIG. 4A) has a negative value. Pitching backward in the direction $P_2$ (FIG. 4B) has a positive value. The static, pitch-free condition therefore has a value of zero.

The lenses 50, 60 are fixed to the cab 30 and, thus, measuring the cab pitch likewise measures the pitch of each lens. The accelerometer 70 can be connected to the housing 42 but could alternatively be connected to the cab 30 at a location spaced from the housing. The lenses 50, 60 and accelerometer 70 are electrically connected to the controller 80. The controller 80 receives signals from the accelerometer 70 to monitor the cab 30 pitch. The controller 80 uses an algorithm to determine which lens 50, 60 is better suited to capture images in front of the vehicle 20 based on the signals received from the accelerometer 70. In one example, the controller 80 uses a predetermined threshold, e.g., +/−5° to 10° pitch from the pitch-free condition, to switch between lenses 50 or 60. Other pitch thresholds can be utilized and can be symmetric or asymmetric relative to the pitch-free condition, e.g., a 5° forward pitch threshold and a 10° backward pitch threshold.

FIGS. 4A-4B illustrate instances in which the cab 30 of the vehicle 20 pitches but the sensed pitch does not exceed the predetermined threshold. In FIG. 4A, deceleration of the vehicle 20 causes the cab 30 to pitch forward $P_1$ about the axis 100 less than the predetermined threshold. The deceleration can be caused by braking and forces the front end 22 of the vehicle 20 to tilt downward towards the road 36.

The accelerometer 70 senses the forward pitch $P_1$ and sends signals indicative thereof to the controller 80. Since the sensed pitch $P_1$ is less than the predetermined threshold, the controller 80 continues using the default first lens 50 to capture images in front of the vehicle 20 within the field of view 52. Due to the forward pitch $P_1$ of the cab 30, the lens 50 likewise pitches forward, causing the field of view 52 to pivot downward towards the road 36 compared to its orientation in the normal driving condition shown in FIG. 3.

As a result, the intersection point between the field of view 52 and the road 36 (indicated at 53') moves closer to the front 22 of the vehicle 20. In other words, the intersection point 53' is located a longitudinal distance $D_3$ from the lens 50 less than the distance $D_1$. Since the angular range $\alpha_1$ of the field of view 52 does not change, the pivoted field of view covers less of the area 54 compared to its orientation in the normal driving condition. That said, the lens 50 takes images in front of the vehicle 20 within the pivoted field of view 52 and sends the images to the controller 80 for evaluation as previously discussed. One or more vehicle systems can operate in response to the evaluations. The camera system 10 does not rely on the lens 60 for image capturing or process images therefrom in the vehicle 20 condition shown in FIG. 4A.

In FIG. 4B, acceleration of the vehicle 20 causes the cab 30 to pitch backward $P_2$ about the axis 100 less than the predetermined threshold. This forces the front end 22 of the vehicle 20 to tilt upward away from the road 36. The accelerometer 70 senses the backward pitch $P_2$ and sends signals indicative thereof to the controller 80. Since the sensed vehicle pitch $P_2$ is less than the predetermined threshold, the controller 80 continues using the default first lens 50 to capture images in front of the vehicle 20 within the field of view 52. Due to the backward pitch $P_2$ of the cab 30, the lens 50 likewise pitches backward, causing the field of view 52 to pivot upward away from the road 36 compared to its orientation in the normal driving condition. As a result, the field of view 52 pivots to a position in which it does not intersect the road 36. Since the angular range $\alpha_1$ of the field of view 52 does not change, the pivoted field of view covers more of the area 54 compared to its orientation in the normal driving condition.

It will be appreciated that the backward pivoted position of the field of view 52 could intersect the road 36 (not shown) depending on its orientation in the normal driving condition. In such a case, the intersection point between the field of view 52 and road 36 closest to the front 22 of the vehicle 20 would be at a longitudinal distance from the lens 50 greater than the distance $D_2$. In any case, the lens 50 takes images in front of the vehicle 20 within the pivoted field of view 52 and sends the images to the controller 80 for evaluation as previously discussed. One or more vehicle systems can operate in response to the evaluations. The camera system 10 does not rely on the lens 60 for image capturing or process images therefrom in the vehicle 20 condition shown in FIG. 4B.

Figure 5A:
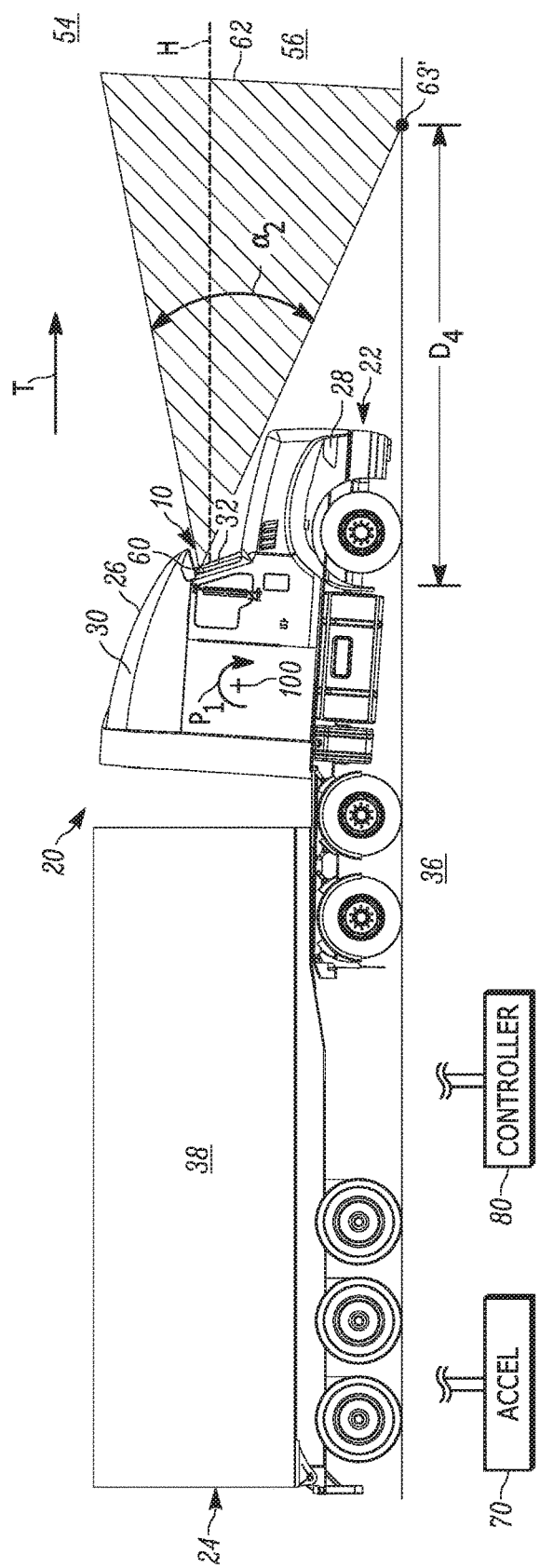
FIG. 5A is a side view of a first condition of the camera system when the vehicle pitches forward more than the predetermined amount.
Figure 5B:
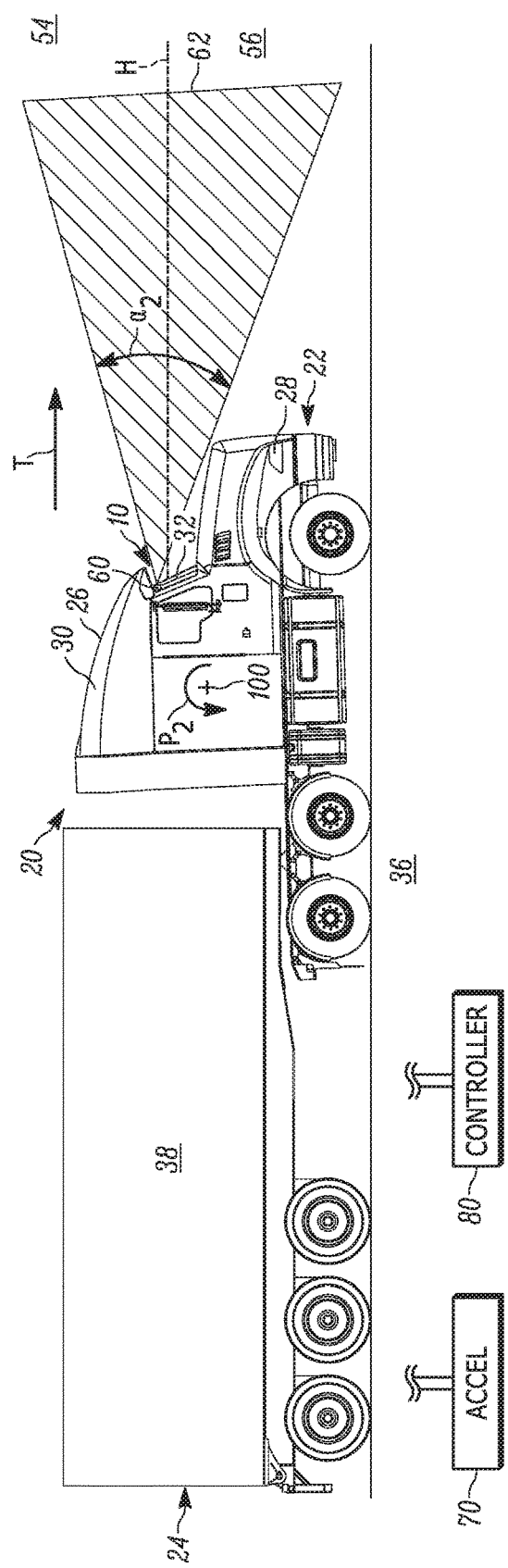
FIG. 5B is a side view of a second condition of the camera system when the vehicle pitches backward more than the predetermined amount.

FIGS. 5A-5B illustrate instances in which the cab 30 pitches an amount exceeding the predetermined threshold. In FIG. 5A, rapid deceleration of the vehicle 20 causes the cab 30 to pitch forward $P_1$ more than the predetermined threshold. The accelerometer 70 senses the forward pitch $P_1$ and sends signals indicative thereof to the controller 80. In response, the controller 80 ceases reliance on the first lens 50 for image capturing/processing and instead relies on the second lens 60 for image capturing/processing. In other words, the controller 80 only receives and processes images from the second lens 60.

Due to the forward pitch $P_1$ of the cab 30, the lens 60 likewise pitches forward, causing the field of view 62 to pivot downwards towards the road 36 compared to its orientation in the normal driving condition. As a result, the first intersection point between the field of view 62 and the road 36 (indicated at 63') moves closer to the front 22 of the vehicle 20. In other words, the intersection point 63' is located a longitudinal distance $D_4$ from the second lens 60 less than the distance $D_2$. Since the angular range $\alpha_2$ of the field of view 62 does not change, the pivoted field of the view covers less of the area 54 compared to its orientation in the normal driving condition. That said, the lens 60 takes images in front of the vehicle 20 within the pivoted field of view 62 and sends the images to the controller 80 for evaluation as previously discussed. One or more vehicle systems can operate in response to the evaluations.

In FIG. 5B, rapid acceleration of the vehicle 20 causes the cab 30 to pitch backward $P_2$ more than the predetermined threshold. The accelerometer 70 senses the backward pitch $P_2$ and sends signals indicative thereof to the controller 80. In response, the controller 80 ceases reliance on the first lens 50 for image capturing/processing and instead relies on the second lens 60 for image capturing/processing. In other words, the controller 80 only receives and processes images from the second lens 60.

Due to the backward pitch $P_2$ of the cab 30, the second lens 60 likewise pitches backward, causing the field of view 62 to pivot upwards away the road 36 compared to its orientation in the normal driving condition. As a result, the field of view 62 pivots to a position in which it does not intersect the road 36. Since the angular range $\alpha_2$ of the field of view 62 does not change, the pivoted field of view 62 covers more of the area 54 compared to its orientation in the normal driving condition.

It will be appreciated that the backward pivoted position of the field of view 62 could intersect the road 36 (not shown). In such a case, the intersection point between the field of view 62 and road 36 would be at a longitudinal distance from the lens 60 greater than the distance $D_4$. In any case, the lens 60 takes images in front of the vehicle 20 within the pivoted field of view 62 and sends the images to the controller 80 for evaluation as previously discussed. One or more vehicle systems can operate in response to the evaluations.

The controller 80 continuously receives signals from the accelerometer 70 to monitor the cab 30 pitch. Consequently, once the pitch returns to an amount within the predetermined threshold, the controller 80 turns off the second lens 60 and turns the first lens 50 back on. The field of view 52 is then used until/unless the cab 30 again pitches in either direction to a degree exceeding the predetermined threshold.

The camera system 10 of the present invention is advantageous in that multiple lenses with different fields of view can be used to accurately capture images in front of the vehicle under different driving conditions. Other vehicle systems that rely on processing image data in front of the vehicle can therefore reliably react to changing conditions on the road.

In one example illustrating the advantages of the camera system 10, the vehicle accelerates to a degree sufficient to pitch the vehicle backwards $P_2$ beyond the predetermined threshold (see FIG. 5B). If the camera system 10 continued relying on the first lens 50 to image in front of the vehicle 20, the field of view 52 would be tilted away from the road 36 and could create an imaging blind spot in front of the vehicle between the bottom of the field of view and the road.

In another example, the camera system 10 relies on both the first lens 50 and the second lens 60 when the vehicle pitches either forward $P_1$ less than the predetermined threshold or backwards $P_2$ less than the predetermined threshold, or when the vehicle is not pitched. Consequently, images are captured within both fields of view 52, 62 when the vehicle pitch $P_1$, $P_2$ is non-existent or minor, i.e., within the predetermined threshold (see FIG. 3 for simultaneously lens use).

However, when the vehicle pitch $P_1$ or $P_2$ exceeds the predetermined threshold, the controller 80 deactivates one of the lenses 50 or 60 and relies solely on the still-activated lens to capture images. More specifically, when the vehicle pitches forward $P_1$ beyond the predetermined threshold, the second lens 60 is deactivated and only the first lens 50 is used to capture images for the reasons discussed (see FIG. 4A). When the vehicle pitches backward $P_2$ beyond the predetermined threshold, the first lens 50 is deactivated and only the second lens 60 is used to capture images for the reasons discussed (see FIG. 5A). As a result, in the case of excessive or extreme pitch $P_1$ or $P_2$, the camera system 10 dedicates all the processing power to the lens 50 or 60 capable of adequately/sufficiently viewing the area in front of the vehicle 20.

That said, using the camera system 10 of the present invention allows the controller 80 to switch to the second lens 60 having a field of view 62 closer to the road 36. Switching lenses 50, 60 helps ensure the vehicle pitch does not create undesirable imaging blind spots. The lenses 50, 60 can therefore operate together to collectively maintain reliable imaging in front of the vehicle 20 as the vehicle pitches backward and forward $P_1$, $P_2$. This thereby allows the controller 80 to properly evaluate conditions in front of the vehicle 20 and, if needed, actuate one or more vehicle systems in response to the evaluations. The camera system 10 can, for example, help the vehicle automatically brake based on imaging an object in the field of view 62 that otherwise would be undetected by the field of view 52.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A camera system for a vehicle, comprising:
   a first lens connected to the vehicle and having a first field of view extending in front of the vehicle in which images are captured;
   a second lens connected to the vehicle and having a second field of view different from the first field of view and extending in front of the vehicle in which images are captured;
   a sensor for measuring vehicle pitch; and
   a controller connected to the sensor and relying only on the first lens to capture images when the vehicle pitch is below a predetermined threshold and relying only on the second lens to capture images when the vehicle pitch is above the predetermined threshold.

2. The camera system recited in claim 1, wherein the first field of view extends over a first angular range and the second field of view extends over a second angular range different from the first angular range.

3. The camera system recited in claim 2, wherein the second angular range is greater than the first angular range.

4. The camera system recited in claim 1, wherein the first field of view extends over a first angular range and the second field of view extends over a second angular range the same as the first angular range, the first and second fields of view being tilted relative to one another.

5. The camera system recited in claim 1, wherein the first field of view overlaps the second field of view.

6. The camera system recited in claim 1, wherein the predetermined threshold is a pitch of about 5° to about 10° in a forward direction and a backward direction.

7. The camera system recited in claim 1, wherein the first lens and the second lens are positioned behind a windshield of the vehicle.

8. The camera system recited in claim 1, wherein the first field of view intersects the ground at a location further in front of the vehicle than a location at which the second field of view intersects the ground.

9. The camera system recited in claim 1, wherein the controller evaluates the captured images and actuates one or more vehicle systems in response to the evaluations.

10. A method of capturing images in front of a vehicle, comprising:
    connecting a first lens to the vehicle having a first field of view in which images are captured that extends in front of the vehicle;
    connecting a second lens to the vehicle having a second field of view in which images are captured that is different from the first field of view and extends in front of the vehicle;
    sensing vehicle pitch; and
    capturing images by relying only on the first lens when the vehicle pitch is below a predetermined threshold and capturing images by relying only on the second lens when the vehicle pitch is above the predetermined threshold.

11. The method recited in claim 10, wherein the first field of view extends over a first angular range and the second field of view extends over a second angular range different from the first angular range.

12. The method recited in claim 11, wherein the second angular range is greater than the first angular range.

13. The method recited in claim 10, wherein the first field of view extends over a first angular range and the second field of view extends over a second angular range the same as the first angular range, the first and second fields of view being tilted relative to one another.

14. The method recited in claim 10, wherein the first field of view overlaps the second field of view.

15. The method recited in claim 10, wherein the predetermined threshold is a pitch of about 5° to about 10° in a forward direction and a backward direction.

16. The method recited in claim 10 further comprising positioning the first lens and the second lens behind a windshield of the vehicle.

17. The method recited in claim 10, wherein the first field of view extends further in front of the vehicle than the second field of view.

18. The method recited in claim 10, wherein the first field of view intersects the ground at a location further in front of the vehicle than a location at which the second field of view intersects the ground.

19. The method recited in claim 10 further comprising evaluating the captured images and actuating one or more vehicle systems in response to the evaluations.

20. A method of capturing images in front of a vehicle, comprising:
    connecting a first lens to the vehicle having a first field of view in which images are captured that extends in front of the vehicle;
    connecting a second lens to the vehicle having a second field of view in which images are captured that is different from the first field of view and extends in front of the vehicle;
    sensing vehicle pitch; and
    capturing images with both the first and second lenses when the vehicle pitch is below a predetermined threshold and capturing images by relying only on one of the first lens or the second lens when the vehicle pitch is above the predetermined threshold.

* * * * *